Oct. 15, 1968  E. M. DEXTER  3,405,728
ELECTRO-VISCOUS FLUID VALVE
Filed June 3, 1963  2 Sheets-Sheet 1
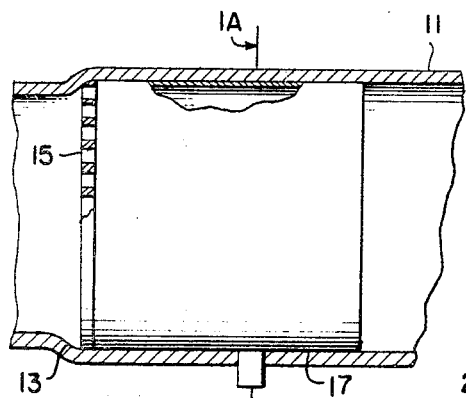
FIG. 1
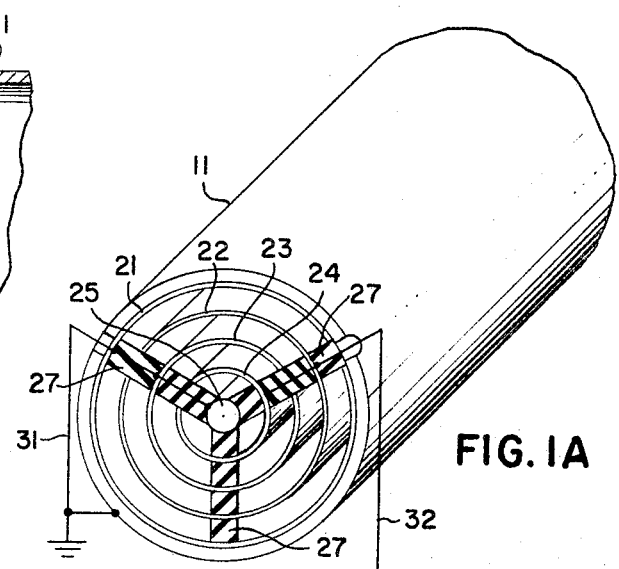
FIG. 1A
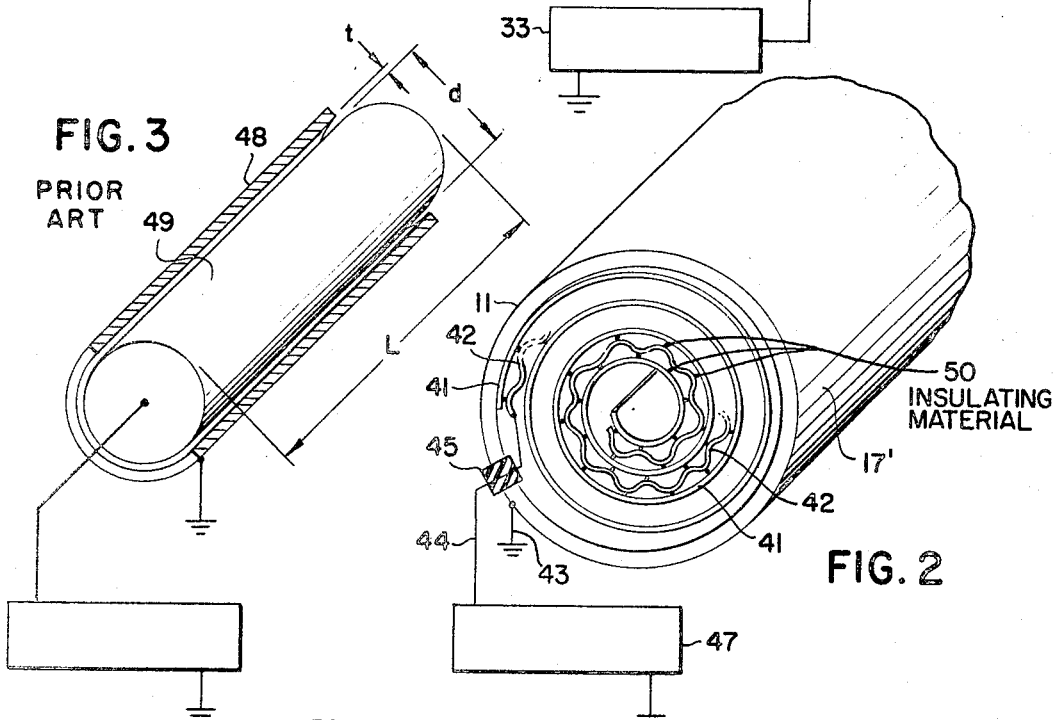
FIG. 3 PRIOR ART
FIG. 2
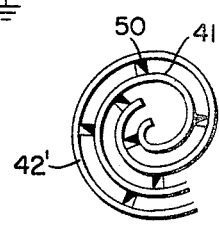
FIG. 2A
INVENTOR.
EDWIN M. DEXTER
BY
*Irving Kayton*
ATTORNEY Oct. 15, 1968      E. M. DEXTER      3,405,728
ELECTRO-VISCOUS FLUID VALVE
Filed June 3, 1963      2 Sheets-Sheet 2
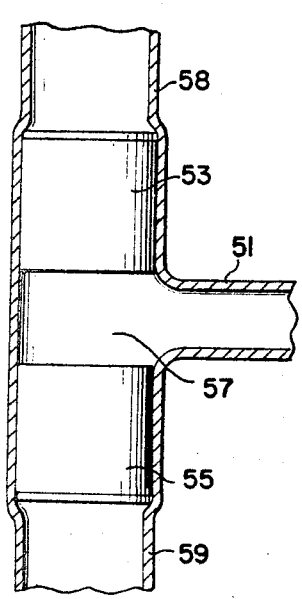
FIG. 5
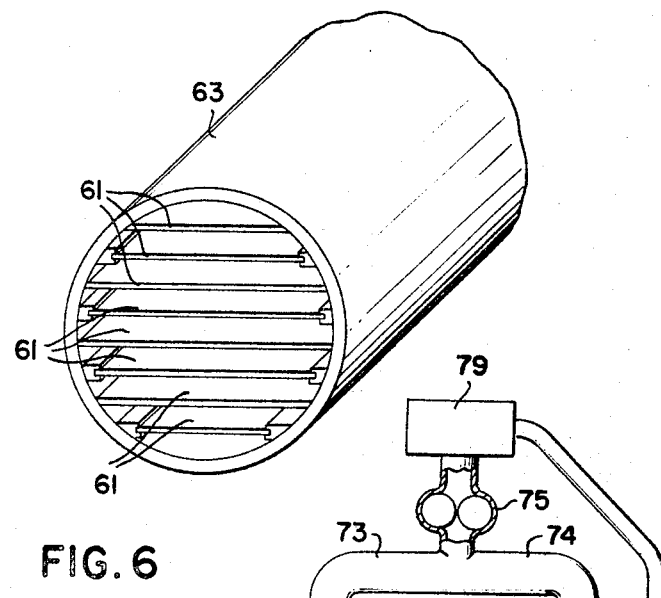
FIG. 6
FIG. 7
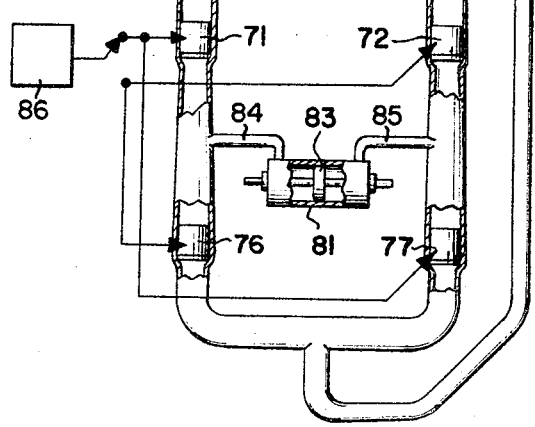
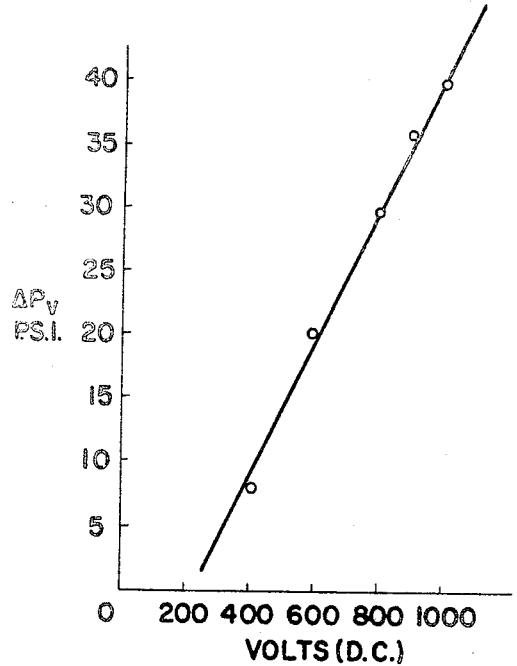
FIG. 4
INVENTOR.
EDWIN M. DEXTER
BY
*Irving Kayton*
ATTORNEY United States Patent Office 3,405,728
Patented Oct. 15, 1968

3,405,728
ELECTRO-VISCOUS FLUID VALVE
Edwin M. Dexter, Silver Spring, Md., assignor to General
Electric Company, a corporation of New York
Filed June 3, 1963, Ser. No. 285,133
10 Claims. (Cl. 137—251)

This invention relates to valves wherein fluid flow through the valves is controlled by an electric potential applied across the fluid in the valve, and particularly to an improved construction for such valves wherein system losses are substantially reduced.

Electro-viscous fluids denote fluids wherein certain solid materials are suspended in a dielectric liquid and which when subjected to an electrical stress, apparently tend to orient and, by doing so, greatly affect the apparent viscosity of the fluid. If the electrical stress is made sufficiently great, fluid flow can be markedly diminished or halted as desired. Thus, for example, the viscosity of the electro-viscous fluid passing between a pair of electrode plates is increased by applying either A.C. or D.C. voltage across the plates. With a constant flow between the plates, the fluid pressure drop can be varied with the voltage applied; on the other hand, with constant fluid pressure systems, the flow can be shut off if sufficient voltage is applied.

Present theory for this electro-viscous effect is that the solid particles in the dielectric liquid are semi-conducting, and when an electric potential exists the particles may be polarized and consequently link themselves in chains. The shear strength or viscosity is therefore increased. It is believed that actual current flow is required to produce this effect.

In a closed electro-viscous fluid system, this effect can be used in a positive way to control fluid flow in much the same way as a mechanical valve may be utilized. Furthermore, it has been found that on-off operation, and therefore the starting and stopping of fluid flow, may be provided at relatively high frequencies, e.g., over 400 cycles per second. As a consequence, oscillatory motion in output devices may be made to follow an oscillatory electrical control signal applied to the electro-viscous valve.

An important problem posed by the electro-viscous fluid valves of the prior art arises from the fact that the electric potential must be applied over a considerable distance along the path of fluid flow, in order to be able to halt the flow of fluid substantially completely. However, the passage of the fluid between the electrode surfaces over a long distance results in a substantial loss in pressure merely due to surface friction. This high impedance is undesirable, since inordinately high supply pressures are required for an operative system, especially if more than one valve is utilized in the closed system.

Accordingly, it is an object of this invention to provide an electro-viscous fluid valve exhibiting a lower impedance to fluid flow than has heretofore been possible, while providing the same magnitude of electro-viscous effect for a given voltage.

It is another object of this invention to provide an electro-viscous fluid valve which for a given electro-viscous effect is both shorter in length and introduces a smaller pressure loss, i.e., head loss, than has heretofore been possible.

The above objects are accomplished in accordance with the principles of the invention, in one aspect, by recognizing that: a decrease in length of the valve, i.e., electrodes, in the direction of flow decreases both the head loss and the electro-viscous effect; a decrease in the spacing between the electrode surfaces increases the electro-viscous effect and increases the head loss; however, increasing the effective width of the plates, i.e., the dimension of the electrodes in a plane at right angles to the fluid flow direction, while it decreases head loss, does not modify the electro-viscous effect. Therefore, in accordance with the principles of the invention, an electro-viscous fluid valve embodiment satisfying the above objects is obtained in a valve providing a specified and desired electro-viscous effect having a shorter electrode length, smaller electrode spacing and greater electrode transverse dimension than the prior art device.

In embodiments of the invention hereinafter to be described in detail, the electro-viscous fluid valve is a cylindrical type valve whose electrodes are disposed relative to each other within the cylinder in a special way. The increased transverse dimension or effective width is obtained, in one embodiment, by wrapping two spaced electrode plates to form a closely wound spiral in transverse cross-section. The spiral arrangement provides the increased effective width, and therefore the length of the cylindrical valve and the spacing between the cylindrical electrodes may be decreased without changing the magnitude of the electro-viscous effect, but considerably decreasing head loss. In this embodiment, one of the two electrodes is corrugated prior to being wrapped with respect to the second electrode plate. The corrugated shape functions to space the corrugated electrode from the uncorrugated electrode with insulating material located at the lines of contact or tangency between the corrugated and uncorrugated plates.

In another embodiment in accordance with the principles of the invention, the effective width or transverse electrode dimension is made large by using a multiplicity of concentric coaxial cylinders as electrodes with insulating spacers maintaining the multiplicity of cylinders in fixed relationship to each other. Each electrode may be maintained at a different voltage from its next adjacent coaxial electrodes. The multiplicity of coaxial cylinders provides a plurality of fluid paths through the valve, thereby providing an increased effective electrode width to achieve the advantages of the invention. Embodiments using other electrode geometries in accordance with the principles of the invention are also described in detail.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings.

FIG. 1 is a side elevational view of an electro-viscous valve embodiment of the invention with the outer pipe in section;

FIG. 1A is a transverse cross-sectional cabinet view of an electrode package embodiment of the invention for use in the valve of FIG. 1;

FIG. 2 is a transverse cross-sectional cabinet view of another electrode package embodiment of the invention for use in the valve of FIG. 1;

FIG. 2A is an end section view useful in explaining the invention shown in FIG. 2;

FIG. 3 is an isometric view of a prior art electro-viscous fluid valve with the outer shell in longitudinal section;

FIG. 4 is a graphic representation of the relationship between pressure drop and applied voltage in an electro-viscous fluid valve;

FIG. 5 is an elevational view of a three-way valve embodiment of the invention with the pipe in section;

FIG. 6 is a transverse cross-sectional cabinet view of another electrode package embodiment of the invention; and FIG. 7 is a system representation of an electro-viscous servo valve embodiment of the invention using four valves in an electro-hydraulic bridge circuit.

Referring to FIG. 1 in greater detail, there is disclosed an electro-viscous fluid valve comprising a pipe 11 having a shouldered portion 13 internal thereto. A perforated backup plate 15 extends across the transverse cross-section of pipe 11 with its periphery engaging the shoulder 13. Backup plate 15 contains a multiplicity of perforations of number sufficient to permit relatively free transfer of electro-viscous fluid from either side to the other of backup plate 15. The backup plate has its external periphery preferably in intimate contact with the internal circumference of pipe 11 at the region of shoulder 13 and is sufficiently tight fitting that it is fixedly secured within pipe 11 by mechanical pressure to anchor it against shoulder 13.

An electrode package 17 comprises the control portion of the valve. Electrode package 17 is cylindrical in external shape, having one end in contact with a surface of backup plate 15. Electrode package 17 is constructed in a special manner now to be described. In FIG. 1A, there may be seen a transverse cross-sectional cabinet view of the electrode package taken along lines 1A of FIG. 1. Concentric and coaxially disposed cylindrical electrodes 21–25 are mounted in pipe 11 in insulated spaced relation to each other by virtue of spacers 27. Spacers 27 are of appropriate insulating material and the cylindrical electrodes may be of copper or other electrically conductive metal. The radial spacing $t$ between any two adjacent electrode cylinders is preferably the same. Electrodes 21, 23 and 25 are electrically connected and may be maintained at one level of potential, while electrodes 22 and 24 are electrically connected and may be maintained at another level of potential, such that a difference of potential may be sustained between any pair of adjacent cylindrical electrodes. The electrical lead line 31 connects electrodes 21, 23 and 25 (which are grounded to pipe 11) through one set of the insulating spacers which may also function as insulator bushings through electrodes 22 and 24, while electrodes 22 and 24 are electrically connected by lead line 32 through a second set of insulating spacers which may also function as insulating bushings through electrodes 21, 23 and 25 and pipe 11. A D.C. voltage source 33 is connected between electrical leads 31 and 32.

Electro-viscous fluid flows longitudinally through the concentric cylinders from right to left under pressure from a constant pressure source (not shown) e.g. a gear pump. Several types of electro-viscous fluid may be used in the valve of FIG. 1. One composition which has been found to be satisfactory comprises kerosine (100 parts by weight), silica gel (90 parts by weight), and methanol (nine parts by weight). Replacement of the kerosine with paraffin oil (150 parts by weight) also provides a satisfactory electro-viscous fluid.

In operation, when the voltage from source 33 is zero, there is no electro-viscous effect impressed upon fluid flowing (flow is from right to left) through electrode package 17 in pipe 11 of FIG. 1. However, with voltage impressed between leads 31 and 32, the flow rate of fluid through electrode package 17 decreases, i.e., the viscosity has apparently increased. The increase in viscosity is proportional to the voltage, and the flow stops completely when a sufficiently high voltage is applied.

In FIG. 2 is shown, in transverse cross-sectional cabinet view, another form of electrode package for the valve of FIG. 1. The electrode package 17′ comprises two spaced metallic plate electrodes 41 and 42 wrapped to form a spiral cross-section. The electrode 42 is corrugated to form an undulating path in the transverse direction. The lines of contact or tangency between corrugated electrode 42 and uncorrugated electrode 41 are formed with an insulating material 50 to preclude short-circuiting electrodes 41 and 42. The remaining portions of the surfaces of electrodes 41 and 42, however, are uninsulated and current flow between the two electrodes is possible with appropriate fluid therebetween. A voltage source 47 may be applied between electrodes 41 and 42 through lead lines 43 and 44. Electrode 41 may be grounded to pipe 11 while electrode 42 has its lead 44 connected through insulating bushing 45 to voltage source 47. Electro-viscous fluid flow is through all the channels formed between the corrugated and flat electrodes.

The spiral electrode package 17′ may be constructed with an uncorrugated electrode 42′. Two uncorrugated metallic sheets may be wrapped into a spiral as before with spaced insulator spacers between them rather than having the undulations in the corrugations providing the spacing as shown in FIG. 2A.

The advantageous effect provided by coaxial cylindrical electrode package 17 of FIG. 1A and the spiral electrode package 17′ of FIG. 2 can best be understood by considering the effective parameters for electro-viscous fluid valves relative to a prior art cylindrical electro-viscous fluid valve. In FIG. 3, there is shown part of such a prior art valve having an external hollow cylindrical shell 48, the inside surface of which is a first electrode, and an internal solid cylinder 49, the outer surface of which functions as the second electrode. The length in inches of the electrodes is represented as L, the difference between the diameter of the inner cylinder and the internal diameter of the outer cylinder in inches (i.e., the electrode spacing) is $t$, and the diameter $d$, in inches of the internal cylinder is proportional to the effective width of the electrodes. Thus, if the cylinder electrode surfaces were slit longitudinally and spread open to form two flat plates, they would have a width directly proportional to the diameter $d$ of the internal cylinder. In such a fluid valve, it has been ascertained that the following empirical equation holds for the particlular electro-viscous fluid which was used and the flow condition under which the tests were made:

$$\Delta P_h \dot= \frac{K}{d} \frac{L}{(t-.005)} Q^{1/2} \quad (1)$$

where $\Delta P_h$ is the head loss in pounds per square inch, Q is the flow of the electro-viscous fluid in cubic inches per second, and K is a constant. It may be noted that head loss increases with the length L of the cylindrical valve and decreases with the electrode spacing $t$ as well as decreasing with effective electrode width $d$. However, the electro-viscous effect is affected in a somewhat different way by certain of these parameters as related by the following empirically determined relationship:

$$\Delta P_v \dot= C \frac{VL}{t} \quad (2)$$

where V is voltage applied, $\Delta P_v$ is pressure loss due solely to the electro-viscous effect and C is a constant. The effect of voltage change on the pressure drop due to the electro-viscous effect is shown graphically in FIG. 4 where the ordinate is $\Delta P_v$ in pounds per square inch, and the abscissa is D.C. volts.

Equation 2 shows that the electro-viscous effect produces a drop in pressure when the electrode spacing $t$ is decreased. It may be further noted, however, that the effective width $d$ of the electrodes does not enter into this equation in any way at all. Thus, varying the effective width of the electrode will have no effect on the pressure drop due to the electro-viscous effect. It follows, therefore, as may be seen by looking at Equations 1 and 2 that a decrease in length L, which reduces the head loss $\Delta P_h$ (Equation 1), can have its decrease in electro-viscous effect $\Delta P_v$ (Equation 2) offset by decreasing the inter-electrode spacing $t$ (Equation 2), while the increase in head loss $\Delta P_h$ due to the decrease in $t$ (Equation 1) may be offset by increasing the effective width $d$ (Equation 1). Since the effective width $d$ has no effect on the electro-viscous effect $\Delta P_v$ at all (Equation 2) a constant electro-viscous effect can be maintained even though head loss is decreased by reducing L, due to a reduction in $t$ and an increase in $d$.

Effectively, this is what is done in accordance with the principles of the invention in FIGS. 1, 1A and 2. Compared with the prior art cylindrical valve of FIG. 3, the electrode packages 17 and 17' of the invention have: a shorter length L than the prior art device (for a pipe of the same diameter), greater inter-electrode spacing $t$, and considerably greater effective width $d$ by virtue of the convolutions formed by the spiral electrodes in FIG. 2 and the multiplicity of coaxial cylindrical pairs in FIG. 1A.

FIG. 5 is a representation, in elevation view, with the pipe of the valve in section, of a three-way valve embodiment in accordance with the principles of the invention. The valve may be considered to comprise three portions. The first portion is a pipe 51 for supporting the flow of electro-viscous fluid. The second and third portions comprise fluid valves 53 and 55, in most respects identical to the electro-viscous fluid valve of FIG. 1, but arranged in a special way. Valve 53, similar to the valve of FIG. 1, has its flow axis oriented at right angles to the longitudinal axis of pipe 51. Valve 55 is arranged as a mirror image of valve 53. In the embodiment of FIG. 5 coupling is provided from pipe 51 to a common volume 57 between valves 53 and 55 to provide a closed-three-way valve construction. Because of the decreased length L of each of valves 53 and 55 for a given diameter pipe, in accordance with the principles of the invention, this three-way valve construction is practical in circumstances where space requirements previously may have precluded it.

In operation, and assuming that no control voltage is applied to either of valves 53 or 55, electro-viscous fluid flows from right to left along pipe 51 and passes into the common volume 57 of the two valves. It then divides equally between the two valves, to provide equal amounts of fluid output through pipes 58 and 59 constituting the output lines from valves 53 and 55, respectively. The amount of fluid flow (assuming a constant pressure source for the fluid passing through pipe 51) from either or both of pipes 58 and 59 is determined by the control voltage applied to electrode packages of one or both of the valves 53 and 55. Thus, if a sufficiently high potential is applied to the electrode package of valve 53, all of the fluid flow from pipe 51 will pass through valve 55 and out pipe 59. Conversely, all of the flow may be made to pass through valve 53 and out pipe 58 by having zero control voltage applied to the electrode package of valve 53 and a large voltage applied to valve 55.

Any desired intermediate distribution of the fluid flow from pipe 51 may clearly be obtained by applying an intermediate magnitude voltage to one or both of the electrode packages of valves 53 and 55. Furthermore, all flow may be stopped by applying a large enough voltage to shut both valves.

In the embodiments thus far described (other than FIG. 3), the electrode package configurations in accordance with the principles of the invention are designed to provide a greater effective electrode width or transverse dimension than would be provided in a prior art valve of a given sized pipe. Under different practical circumstances, different ones of the constructions thus far described may be more advantageous than others. Another useful electrode geometry that may be appropriate for special application is shown in FIG. 6. Parallel plates 61 are arranged in a cylindrical passage or pipe 63 (shown in transverse cross-section). Under the constraints in accordance with Equations 1 and 2 with respect to electrode spacing $t$, greater effective widths may be obtained by this stacking of parallel electrode plates than could be obtained by having a circumferential annular passage as in the prior art device of FIG. 3. In the arrangement of FIG. 6, pipe 63 is preferably insulated from alternate ones of plates 61, such that each plate may be maintained at a different potential from the next adjacent plate. Clearly, the electrode package arrangement of FIG. 6 may also be especially advantageous where the fluid passage has a rectangular rather than a cylindrical transverse cross-section.

In FIG. 7, there is shown a four-way servo valve arranged as an electro-viscous valve type bridge control circuit. There are four valves such as that of FIG. 1, arranged in a bridge circuit with a spool type valve disposed across the bridge. As shown in FIG. 7, there may be seen a bridge circuit wherein valves 71 and 72 are disposed in parallel and supplied by lines 73 and 74, respectively, from an electro-viscous liquid gear pump 75. Further on, in series with valve 71 is electro-viscous fluid valve 76, while fluid valve 77 is in series with valve 72. A sump tank 79 pressurized by a bellows spring system connects the output lines of valves 76 and 77. In the line between valves 71 and 76 on the one hand, and in the line between valves 72 and 77 on the other, are fluid lines connected as left and right input lines to spool valve 81. Spool valve 81 has an actuator 83 therein, such that when fluid pressure increases from the left through line 84, the actuator is moved to the right and conversely, when fluid pressure increases from the right through line 85, the actuator is moved to the left.

The electro-hydraulic system utilizing electro-viscous fluid of FIG. 7 functions as a bridge circuit in the manner now to be described. By applying a voltage between the plurality of electrodes of each of valves 72 and 76 from source 86, the pressure loss due to the electro-viscous effect through these two valves is increased. Valves 71 and 77, however, are unaffected. Accordingly, the pressure applied on the left-hand side through line 84 to spool valve 83 is in excess of the pressure on the right-hand side thereof. Accordingly, actuator 83 moves to the right until a pressure balance has been established. Conversely, the application of a voltage between the plurality of electrodes of each of valves 71 and 77 from source 86 rather than valves 72 and 76 moves actuator 83 to the left, because of the increased pressure on the right-hand side thereof; actuator 83 comes to rest in its uncentered position when the pressure differential on its two sides equalizes.

With no voltage applied to any of the four valves, the pressure drops in all of the legs are equal, so that the pressures on each side of the actuator are half the supply pressure, and the actuator remains centered in the valve.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and is desired to be secured by Letters Patent of the United States is:

1. An electro-viscous fluid valve comprising: a passage for supporting the flow of electro-viscous fluid, said fluid consisting of a dielectric fluid which tends to undergo an effective change in viscosity when subjected to an electrostatic field; a multiplicity of electrodes, substantially longitudinally coextensive, disposed in said passage through which said fluid is constrained to pass; and means to control the viscosity and therefore the rate of flow of said fluid comprising means for energizing each of said electrodes at a different voltage from its next adjacent electrode.

2. An electro-viscous fluid valve as recited in claim 1 wherein said multiplicity of electrodes comprises flat plates.

3. An electro-viscous fluid valve as recited in claim 1 wherein said passage is a cylindrical pipe and said electrodes are coaxial cylinders spaced each from the adjacent ones.

4. An electro-viscous fluid valve comprising a cylindrical passage for supporting the flow of an electro-viscous fluid, said fluid comprising a dielectric fluid which tends to undergo an effective change in viscosity when subjected to an electrical field, a plurality of electrodes disposed within said passage for controlling the rate of flow of said fluid when energized with an electrical potential, said plurality of electrodes comprising two sheets of electrically conductive material wrapped jointly to form a spiral in transverse cross-section and physically spaced from each other to permit the passage of electro-viscous fluid through the spacing.

5. An electro-viscous fluid valve as recited in claim 4 wherein one of said two sheets is corrugated, and insulating material located between said two sheets at the regions of said corrugated sheet most closely adjacent the other sheet.

6. An electro-viscous fluid valve comprising: a cylindrical passage for supporting the flow of electro-viscous fluid; a plurality of electrodes within said passage, said plurality of electrodes comprising two sheets of electrically conductive material wrapped jointly to form a spiral in transverse cross-section and physically spaced from each other to permit the passage of electro-viscous fluid through the spacing, and means connected to said two electrodes for applying a voltage across said two electrodes.

7. An electro-viscous fluid valve as recited in claim 6 including insulating material contiguous to both said electrodes and disposed at a multiplicity of locations between said electrodes for physically spacing said electrodes from each other.

8. An electro-viscous fluid valve as recited in claim 7 wherein one of said two electrodes is corrugated and the undulations of the corrugation permit electro-viscous fluid flow along said passage between said electrodes.

9. A three-way electro-viscous fluid valve comprising: a first valve as recited in claim 7; a second valve as recited in claim 6 disposed in a common fluid passage with said first valve and disposed therein as the mirror image of said first valve; said means for applying a voltage across said two electrodes comprising means for applying a voltage to said two electrodes of said first valve independent of the application of a voltage to the two electrodes of said second valve and means for introducing electro-viscous fluid in said passage between said first and second valves.

10. An electro-viscous fluid valve hydraulic bridge circuit comprising: an electro-viscous fluid valve as recited in claim 6 disposed in each of the four legs of said bridge circuit and an hydraulic actuating means responsive to pressure differential across said bridge with one actuable end of said means connected between a first pair of said valves and the other end of said means connected between the second pair of said valves.

References Cited
UNITED STATES PATENTS

| | | | |
|---|---|---|---|
| 346,913 | 8/1886 | Heiss | 137—596 |
| 1,212,290 | 1/1917 | Visser | 137—596 |
| 1,736,643 | 11/1929 | Beck | 103—1 |
| 3,105,379 | 10/1963 | Ellison | 137—251 |
| 3,160,100 | 12/1964 | Poppendiek | 103—1 |
| 3,285,271 | 11/1966 | Kreisman | 137—251 |

WILLIAM F. O'DEA, *Primary Examiner.*

D. LAMBERT, *Assistant Examiner.*